(12) United States Patent
Zhang et al.

(10) Patent No.: US 9,062,154 B2
(45) Date of Patent: Jun. 23, 2015

(54) POLYCARBONATE PREPARATION METHOD

(71) Applicants: WANHUA CHEMICAL GROUP CO., LTD., Yantai, Shandong (CN); WANHUA CHEMICAL (NINGBO) CO., LTD., Ningbo, Zhejiang (CN)

(72) Inventors: Lei Zhang, Shandong (CN); Hongke Zhang, Shandong (CN); Weiqi Hua, Shandong (CN); Linrong Song, Shandong (CN); Yifeng Hu, Shandong (CN); Xiwang Zang, Shandong (CN); Kai Feng, Shandong (CN)

(73) Assignee: WANHUA CHEMICAL GROUP CO., LTD., Yantai, Shandong (CN)

( * ) Notice: Subject to any disclaimer, the term of this patent is extended or adjusted under 35 U.S.C. 154(b) by 0 days.

(21) Appl. No.: 14/358,822

(22) PCT Filed: Nov. 5, 2012

(86) PCT No.: PCT/CN2012/084050
§ 371 (c)(1),
(2) Date: May 16, 2014

(87) PCT Pub. No.: WO2013/071827
PCT Pub. Date: May 23, 2013

(65) Prior Publication Data
US 2014/0350198 A1   Nov. 27, 2014

(30) Foreign Application Priority Data

Nov. 18, 2011  (CN) .......................... 2011 1 0381696

(51) Int. Cl.
| C08G 64/00 | (2006.01) |
| C08G 64/24 | (2006.01) |
| C08G 64/40 | (2006.01) |
| C08G 63/02 | (2006.01) |

(52) U.S. Cl.
CPC .............. *C08G 64/24* (2013.01); *C08G 64/406* (2013.01)

(58) Field of Classification Search
CPC ............. C08G 64/307; C08G 64/1608; C08G 64/0208

USPC ..................... 526/64; 528/372, 196, 198, 371
See application file for complete search history.

(56) References Cited

U.S. PATENT DOCUMENTS

| 3,530,094 A | 9/1970 | Schnell et al. |
| 3,674,740 A | 7/1972 | Vernaleken et al. |
| 4,338,429 A | 7/1982 | Serini et al. |
| 5,182,361 A | 1/1993 | Maria van Hout et al. |
| 5,258,484 A | 11/1993 | Schomacker et al. |
| 8,541,537 B2 | 9/2013 | Ozaki et al. |

FOREIGN PATENT DOCUMENTS

| CN | 1926172 A |   | 3/2007 |
| CN | 101775128 A |   | 7/2010 |
| CN | 102030895 A |   | 4/2011 |
| CN | 102516519 A |   | 6/2012 |
| EP | 1721923 | * | 2/2005 |
| EP | 2088139 A |   | 8/2009 |
| JP | 5306336 A |   | 11/1993 |
| JP | 2005126477 A |   | 5/2005 |
| JP | 2005336332 A |   | 12/2005 |
| TW | 201120091 A |   | 6/2011 |

OTHER PUBLICATIONS

International Search Report and Written Opinion, PCT/CN2012/084050, dated Feb. 28, 2013 (16 pages).

* cited by examiner

*Primary Examiner* — Terressa Boykin
(74) *Attorney, Agent, or Firm* — Armstrong Teasdale LLP

(57) ABSTRACT

Provided is a polycarbonate preparation method, comprising the following steps: a) mixing a phenoxide water aqueous solution of a bisphenol and/or a polyphenol with a phosgene and an inert organic solvent, reacting, and generating a polycarbonate oligomer; b) highly emulsifying the oligomer by reinforced micromixing to form a stable emulsion; and c) introducing the emulsion into a polycondensation reactor for a chain extending reaction, separating and finally obtaining the polycarbonate. Through the reinforced micromixing, the present method can prepare the high-molecular-weight polycarbonate without any catalysts, thus simplifying the post-treatment process of the product and improving product quality.

14 Claims, No Drawings

POLYCARBONATE PREPARATION METHOD

This application claims priority to International Publication Number WO 2013/071827, filed on Nov. 5, 2012, which claims priority to CN Patent Application No. 201110381696.3 filed on Nov. 18, 2011, the disclosures of which are hereby expressly incorporated by reference in their entireties.

FIELD OF THE INVENTION

The present invention relates to a method for continuously producing polycarbonates and specifically to a method for preparing polycarbonates by two-phase interfacial technique.

BACKGROUND OF THE INVENTION

Polycarbonate (PC) has an outstanding impact resistance, creep resistance, high to tensile strength, flexural strength, elongation and rigidity, and it can be subjected to the explosion of TV screens. Further, PC has a high heat resistance and cold resistance, and it can be used at the temperature between 100° C. minus and 140° C. Meanwhile, PC has a fine electrical property, low coefficient of water absorption and good light permeability. Specifically, the visible light transmission of PC can reach about 90% and can be colored with any kind of coloring agent. At present, the large-scale industrialization production mainly relates to the preparation of aromatic polycarbonates, which are currently the second largest engineering plastics in the world. Aromatic polycarbonates have a wide range of uses in the national economy, which can be used in plenty of fields, such as automobiles, electronics and electrics, architecture, office equipments, packaging, sports equipments, medical care, household articles, etc.

At present, the industrialization production of polycarbonate is primarily achieved by interfacial phosgenation process and melt transesterification process, wherein the quality of the product prepared by interfacial phosgenation process is significantly superior to that prepared by melt transesterification process. The interfacial phosgenation process refers to a process for preparing polycarbonate resin by separation and purification after the reaction of the phenoxide dissolved in an alkali metal aqueous solution with phosgene and inert organic solvent(s) (for example, methylene chloride) on an oil-water interface in the presence of an acid acceptor, such as, alkali metal hydroxide aqueous solution.

During the course of an interfacial polycondensation, the reaction rate between phosgene and phenolate negative ions is very fast, so the chloroformate groups will form quickly by the reaction on the oil-water interface. However, the reaction rate between chloroformate groups and phenolate negative ions is much slower, thus conventionally a certain quantity of tertiary amines (such as triethylamine) would be usually added into the reaction as a catalyst, thereby forming an adduct with the chloroformate group, which consequently enhancing the reaction rate between chloroformate groups and phenolate negative ions. Moreover, the introduction of the catalyst leads to adding further processing steps (such as washing with acids) during the washing and purifying steps of the reaction solution to remove the catalyst from the reaction solution for recycling use. On one hand, the introduction of catalyst adds further catalyst's processing procedures, such as prepare, feeding, removal and recovery procedures, which increasing the equipment cost. On the other hand, the introduction of catalyst would easily cause that small amount of catalysts remain in the final resin, while the basic amine-type catalyst would accelerate chain scission of ester bond in the product during the processing of product, thereby reducing the product quality.

U.S. Pat. No. 3,530,094 provides a technique for preparing polycarbonates by a tanks-in-series two-phase interfacial method, which employs a tanks-in-series reactor. Phosgenation reaction takes place in the first reaction kettle, and catalyst and capping agent are added into the second reaction kettle to perform a coupling reaction and an end-capping reaction, wherein the total residence time of the reaction being about 50 mins. Meanwhile, it is pointed out in the patent that the amount of chloroformate group is usually excessive during the interfacial polycondensation process for preparing polycarbonates, and the chloroformate group is finally converted into a phenolic hydroxyl group for end capping via an alkaline hydrolysis.

U.S. Pat. No. 3,674,740 provides a technique for preparing polycarbonates by a two-phase interfacial method which employs a plug flow tubular reactor. The tubular reactor has a series of connected sections with different sizes, wherein the sections with large internal tube diameters are residence time sections and the sections with smaller internal tube diameters are mixing sections. The mixing sections provide Reynolds numbers in the mixing sections greater than 2,000 and the catalyst is added during the reaction.

U.S. Pat. No. 5,258,484 provides a technique for preparing polycarbonates by interfacial polycondensation with a combination of plug flow and complete mixing flow, wherein an organic phase solution containing phosgene introduced therein is first mixed with sodium bisphenol salt solution via the tubular reactor and reacted, then the reaction mixture is introduced into a CSTR to perform a coupling reaction. After a prepolymerization reaction, a catalyst is added into the CSTR in an amount of about 0.25 mol % of the feeding amount of Bisphenol A.

U.S. Pat. No. 4,338,429 provides a method for adding a cationic emulsifier during a phosgenation process, wherein the emulsifier can be tetraalkylammonium salts, etc. Using emulsifier can effectively reduce the interfacial tension between the organic phase and the aqueous phase, and it is advantageous to form the emulsion and improve the stability of emulsion. However, the addition of such an emulsifier makes the subsequent separation and purification difficult and complicated.

U.S. Pat. No. 5,182,361 provides a two-step process for a continuous interfacial polycondensation, wherein the first step (i.e. the reaction of prepolymer) is carried out in a stirring vessel, and a polycondensation of the prepolymer with a chain stopper is carried out in a continuous tubular reactor consisting of static mixers to obtain a product.

Chinese patent No. 101775128 provides a preparation process for preparing a high-molecular-weight polycarbonate via a two-step method, wherein a phosgene is added step by step, thereby obtaining a large number of oligomers having both ends which are phenolate negative ions in the first step to reduce the interfacial tension and improve the emulsifying effect. After a prepolymerization reaction, a catalyst is added into the CSTR in an amount of about 0.3 mol % of the feeding amount of Bisphenol A.

Chinese Patent No. 102030895 provides a process for preparing polycarbonates by adding BPA-sodium salt via a two-step method, wherein BPA is added step by step during the process to reduce the consumption of alkaline solution in the reaction. After a prepolymerization reaction, a catalyst is added into the CSTR in an amount of about 0.3 mol % of the feeding amount of Bisphenol A.

The polymerization reaction to form a polycarbonate mainly occurs on an oil-water interface and the reaction process is essentially controlled by the mass transfer of the dispersed phase. It can be seen from the above patents that the traditional process usually employs a stirring vessel reactor or a tubular reactor, the micro-mixing effect thereof is generally poor, resulting in a larger average droplet diameter of the dispersed phase (the Sauter diameter is usually above several hundreds of microns). In addition, if no catalyst is added during the reaction, it will result in the phenomena such as, the finally obtained molecular weight being significantly low and a large number of chloroformate groups hydrolyzing.

SUMMARY OF THE INVENTION

The object of the present invention is to provide a new process for preparing a polycarbonate, wherein an interfacial polycondensation reaction can be carried out in the absence of the addition of a catalyst, and can reduce the post-treatment process, reducing the device costs and improve the quality of products.

In order to achieve the above object, the present invention provides the method for preparing a polycarbonate as follows, wherein a continuous two-phase interfacial polycondensation process is utilized and the method comprises the following steps:

a) mixing a phenoxide aqueous solution of a bisphenol and/or a polyphenol with a phosgene and an inert organic solvent in a mixing reactor, reacting and obtaining a polycarbonate oligomer;

b) highly emulsifying the oligomer obtained in step a) by reinforced micromixing to obtain a stable emulsion;

c) introducing the stable emulsion obtained in step b) into a polycondensation reactor for a chain extending reaction to obtain a high-molecular-weight polycarbonate solution, finally demulsifying and purifying the reaction solution, thereby obtaining a polycarbonate resin.

According to the present invention, no catalyst is used during the whole continuous two-phase interfacial polycondensation process.

According to the present invention, the bisphenol is one or two or more of Bisphenol A ((2,2-bis(4-hydroxyphenyl)propane), resorcinol, tetrabromobisphenol A, 2,2-bis(4-hydroxy-3-methylphenyl)propane, 2,2-bis(4-hydroxy-3-tert-butylphenyl)propane, 2,2-bis(4-hydroxy-3,5-dimethylphenyl)propane, 4,4-bis(4-hydroxyphenyl) heptanes; preferably Bisphenol A; the polyphenol is 1,1,1-tris (4-hydroxyphenyl)ethane or other polyhydroxy aromatic compound.

According to the present invention, in step a), a bisphenol and/or polyphenol is (are) mixed with an alkali metal hydroxide aqueous solution to form a phenoxide aqueous solution of bisphenol and/or polyphenol. Among them, the concentration of the phenoxide in the aqueous solution is 5~25 wt %, preferably 12~17 wt %; the alkali metal hydroxide is sodium hydroxide, potassium hydroxide or lithium hydroxide, preferably sodium hydroxide; in step a), the molar ratio of the alkali metal hydroxide to the phenolic hydroxyl groups in bisphenol and/or polyphenol is 1.0~1.5, preferably 1.025~1.3.

According to the present invention, in step a), the phosgene can be first mixed with the inert organic solvent, and then the obtained mixture reacts with the phenoxide aqueous phase, or the phosgene can enter into the reaction system with the inert organic solvent and react with the phenoxide aqueous phase, or the inert organic solvent can be first added to the phenoxide aqueous phase, and then the phosgene is added to carry out the reaction. Among them, the phosgene can be a liquid phosgene or a gaseous phosgene.

The inert organic solvent is one or two or more of chlorinated aliphatic hydrocarbons or aromatic hydrocarbons, preferably chlorinated aliphatic hydrocarbons; wherein the chlorinated aliphatic hydrocarbon is one or two or more of methylene chloride, dichloroethane, trichloroethane, tetrachloroethane, and carbon tetrachloride; preferably methylene chloride; and the aromatic hydrocarbon is one or two or more of benzene, toluene, m-xylene, p-xylene, o-xylene, chlorobenzene, o-dichlorobenzene, and chlorotoluene.

According to the continuous two-phase interfacial polycondensation process of the present invention, adding a capping agent is required. The capping agent can be formulated into an alkali metal hydroxide aqueous solution together with the mixture of bisphenols and/or polyphenols in step a), or the capping agent can be added at any stage of the reaction process in step a), or the capping agent can be added before the oligomers are highly emulsified in step b).

The capping agents are various types of monophenol substances known in the literature, preferably C1-C10 alkyl phenol, chlorophenol, 2,4,6-tribromophenol, and further preferably phenol, cumyl phenol, iso-octylphenol or p-tert-butylphenol; the molar ratio of the capping agent to the phenolic hydroxyl groups of the bisphenol and/or polyphenol is 0.005~0.05, preferably 0.008~0.025.

According to the present invention, the mixing reactor in step a) is one or two or more of a combination selected from the group consisting of a plug flow tubular reactor, an impinging stream reactor, a jet reactor, a stirred tank reactor, and a tubular reactor with a loop; preferably a plug flow tubular reactor.

According to the present invention, the reaction temperature for preparing the oligomer in step a) is 15~65° C., preferably 20~40° C., and the obtained polycarbonate oligomer has an average polymerization degree of 1~20, preferably 2~15.

According to the present invention, the reinforced micromixing in step b) can be achieved by means of any reinforced micromixing equipment of known form. The reinforced micromixing equipment can be a high gravity mixing equipment, a high-speed shearing equipment, a hole jet reactor or an impinging stream reactor, and the like.

According to the present invention, the stable emulsion obtained in step b) is a water-in-oil emulsion, and before the molecular weight which meets technological requirements is achieved, the average droplet diameter of the dispersed phase is less than 300 μm; preferably the average droplet diameter of the dispersed phase is less than 50 μm.

According to the present invention, in step b), a small quantity of an alkali metal hydroxide aqueous solution is required to be added before the oligomer is highly emulsified, and the pH value in the reaction course is maintained at 8.5~14; preferably the pH value is 10~13; wherein the alkali metal hydroxide is sodium hydroxide, potassium hydroxide or lithium hydroxide, preferably sodium hydroxide.

According to the present invention, the alkali metal hydroxides in step a) and step b) may be the same or different.

According to the present invention, the polycondensation reactor in step c) is a tank reactor or tanks-in-series reactor, wherein the tank is a static tank and/or a continiuous stirred tank.

According to the present invention, the reaction temperature of the chain extending reaction in step c) is 15~65° C., preferably 25~40° C.; the average residence time required in the chain extending reaction is 0.5~5 h, preferably 1~4 h.

In the polycarbonate high polymer reaction solution of step c), the amount of polycarbonate is 10~30 wt % relative to the polymer solution formed by the polycarbonate and the inert organic solvent. The number average molecular weight of the polycarbonate is 10,000~100,000 Dalton and the molecular weight distribution is 1.5~3.5.

After demulsifying the polycarbonate high polymer reaction solution as well as removal of the impurities in the aqueous phase and removal of the organic solvents, a polycarbonate resin of high molecular weight is obtained.

The inventors have fully understood the feature that the polymerization reaction process of polycarbonates is mainly controlled by the mass transfer of the dispersed phase, and the reaction thereof primarily occurs in the oil-water interface. The present invention employs reinforced micromixing technique, dramatically reduces the average droplet diameter of the dispersed phase in the oligomers, increases the two-phase boundary surface area, and maintains a certain residence time which is sufficient to ensure a chain extending reaction between the chloroformate groups and the phenolate negative ions to produce high-molecular-weight polycarbonate resins.

Throughout the reaction process, it does not require any form of catalyst to be added, omitting the procedures such as arrangement, feeding, removal and recovery of the catalyst in the original process, and further ensures no catalyst remained in the final products, which effectively improves the quality of the products.

According to the present invention, in the first step, any one of known processes for preparing a polycarbonate oligomer can be used to prepare an oligomer having a polymerization degree of 1~20, preferably 2~15. Take Bisphenol A for an example, which having the following formula:

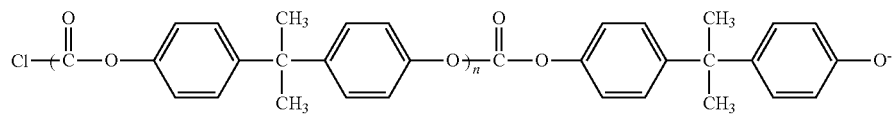

n = 1~20

The oligomer contains both phenolate negative ion groups and chloroformate groups, wherein the phenolate negative ion groups and the chloroformate groups have different hydrophilic and lipophilic properties, thus a certain amount of oligomers containing both of the end groups can be obtained by controlling the molar ratio of the phosgene to the phenoxide. Such oligomers have groups which can reduce the surface activity are distributed on an oil-water interface in orientation, which can effectively reduce the interfacial tension, thereby forming a relatively stable emulsion. However, with the increase of the molecular weight, the chloroformate groups and the phenolate negative ions are rapidly reduced, thus the surface tension increase, and the droplet coalescence occurs, which easily results in a phenomenon of demulsification. In the present invention, the molar ratio of the acyl chloride groups of phosgene to the phenolate negative ion groups is controlled to be 1~1.25:1, preferably 1~1.15:1.

The inventors have found that when the oligomer contains two end groups (i.e., the phenolate negative ion and the chloroformate group) and has an average polymerization degree in the range of 1-20, the average droplet diameter of the dispersed phase is reduced to a micron-size (which is preferably less than 300 μm), a stable emulsion can be obtained. Moreover, a chain extending reaction between chloroformates and phenolate negative ions will occur on the oil-water interface without catalyst; and the smaller the average droplet diameter of the dispersed phase is, the faster the chain extending reaction rate is. Thus, an average droplet diameter such as less than 50 μm is more preferable. If the average polymerization degree of the oligomer is larger than 20 prior to carrying out the emulsification, the resulting emulsion would be unstable and its dispersed phase tends to coalescence, thus a high-molecular-weight polycarbonate resin would be hardly obtained.

The key of the present invention is to improve the micromixing and mass transfer liquid-liquid phase, so the emulsion can be an oil-in-water type or a water-in-oil type. As long as the dispersed phase is up to a certain scale, the reaction can occur without catalyst.

Using a special high efficient mixing device or technical process of the present invention can greatly enhance liquid-liquid phases' micromixing and mass transfer, wherein the mass transfer coefficient and mixing rate can be increased by 1 to 3 orders of magnitude relative to the mass transfer coefficient and mixing rate obtained in the conventional mass transfer and micro-mixing process. Moreover, the average droplet diameter of the dispersed phase can be reduced to a micron-size, or even a nano-size, which thus greatly increases the liquid-liquid phase boundary surface area.

In the present invention, any known reinforced micromixing equipment can be employed after the formation of the oligomer, which would reduce the average droplet diameter of the disperse phase to a micron-size, or even a nano-size, thereby increasing the phase boundary surface area by several orders of magnitude relative to those obtained in the traditional polycondensation process and effectively guaranteeing the stability of the emulsion during the whole polycondensation reaction process and a full contact between the phenolate negative ion groups and the chloroformate groups, so as to ensure the smooth progress of the chain extending reaction. After the dispersion mixing, the emulsion will remain in the subsequent chain extension reactor for a certain time for the preparation of a high-molecular-weight polycarbonate resin, wherein the chain extension reactor can be a reactor equipped with stirring blades, or can be an ordinary tank without any mixing function, or can be a combination thereof.

In interfacial phosgenation process for preparing a polycarbonate disclosed in the currently available literatures and patents, there are no examples of preparing a high-molecular-weight polycarbonate by means of reinforced micro-mixing and mass transfer without the need of adding any form of catalyst during the whole reaction process. The present invention skillfully eliminates the procedures such as arrangement, feeding, removal and recovery procedures of the catalyst in the traditional process, thereby ensuring no catalyst remaining in the final product and effectively improving the product quality.

DETAILED DESCRIPTION OF THE INVENTION

The following examples further illustrate the methods provided in the present invention, but the present invention is not limited to these examples, it should also include any other known modifications within the scope of the claims sought by the present invention. The methods provided by the present invention will be further illustrated referring to the Examples, but the present invention is not accordingly subjected to any restrictions.

Take the preparation of a linear PC having a number average molecular weight of 20,000 Dalton for an example, and the embodiments of the invention are further illustrated.

In the following Examples the materials are used as follows:

Bisphenol A: industrial grade, purchased from Wuxi Resin Factory of Bluestar New Chemical Materials CO., Ltd.; Sodium hydroxide: AR, purchased from Tianjin Kermel Chemical Reagent Co., Ltd.; phosgene: industrial grade, available from Wanhua Chemical Group Co., Ltd.; methylene chloride: AR, purchased from Tianjin Kermel Chemical Reagent Co., Ltd.; phenol: AR, purchased from Chemical Technology Academy of Shandong Province; triethylamine: AR, purchased from Tianjin Kermel Chemical Reagent Co., Ltd.; Hydrochloric acid: AR, purchased from Far Eastern Group.

The molecular weight and the distribution thereof were measured by gel permeation chromatography (GPC) detection, using 254 nm UV detector.

The catalyst remaining in the polycarbonate high polymer solution was measured by gas chromatography.

The droplet diameter distribution of the dispersed phase in the emulsion was measured by light scattering method.

EXAMPLE 1

Bisphenol A (BPA), sodium hydroxide and water were mixed and dissolved to form a phenoxide aqueous solution, i.e., the aqueous phase, wherein Bisphenol A accounted for 15% of the total weight of the aqueous phase, the molar ratio of the hydroxyl group of Bisphenol A to the sodium hydroxide was 1:1.05; and phosgene was dissolved in methylene chloride to form an organic phase, wherein the phosgene concentration was 7.7 wt %. The aqueous phase and the organic phase were pumped into a phosgenation reactor consisting of static mixers at the flow rates of 300 g/min and 280 g/min respectively, maintaining the reaction temperature at 25° C., obtaining a polycarbonate oligomer solution. Then the oligomer solution and the capping agent (i.e., a p-tert-butylphenol/methylene chloride solution having a flow rate of 65 g/min and a concentration of 1.5 wt %) were introduced into a high-shear emulsifying machine, the rotational speed of the emulsifying machine being 15000 rpm. At the same time, a certain amount of sodium hydroxide aqueous solution at a concentration of 32 wt % was added into the high-shear emulsifying machine, maintaining the pH value at 12~14 and the reaction temperature at 32° C. After sufficient dispersion mixing the reaction solution via the high-shear emulsifying machine, the droplet diameters of the dispersed phase in the emulsion were measured, and they had a distribution mainly in a range of 1-50 μm. The emulsion was introduced into a continuous stirred tank reactor, sampling analysis at the following time points of the residence time: 1 hr, 2 hr, 3 hr, and 4 hr, respectively. The results are shown in Table 1.

TABLE 1

The analysis results of Example 1

| Reaction time/hr | Residual BPA/mg/ml | Residual Catalyst/mg/l | Molecular Weight/g/mol | Molecular Weight Distribution |
|---|---|---|---|---|
| 1 | 10.4 | 0 | 17730 | 24 |
| 2 | 4.1 | 0 | 19161 | 2.1 |
| 3 | 1.8 | 0 | 20143 | 2.1 |
| 4 | 1.8 | 0 | 19981 | 2.1 |

EXAMPLE 2

Bisphenol A, sodium hydroxide and water were mixed and dissolved to form a phenoxide aqueous solution, i.e., the aqueous phase, wherein Bisphenol A accounted for 15% of the total weight of the aqueous phase, the molar ratio of the hydroxyl group of Bisphenol A to the sodium hydroxide was 1:1.05; and phosgene was dissolved in methylene chloride to form an organic phase, wherein the phosgene concentration was 7.7 wt %. The aqueous phase and the organic phase were pumped into a phosgenation reactor consisting of static mixers at the flow rates of 300 g/min and 280 g/min to respectively, maintaining the reaction temperature at 25° C., obtaining a polycarbonate oligomer solution. Then the oligomer solution and the capping agent (i.e., a p-tert-butylphenol/methylene chloride solution having a flow rate of 65 g/min and a concentration of 1.5 wt %) were introduced into a high-shear emulsifying machine, the rotational speed of the emulsifying machine being 9000 rpm. At the same time, a certain amount of sodium hydroxide aqueous solution at a concentration of 32 wt % was added into the high-shear emulsifying machine, maintaining the pH value at 12~14 and the reaction temperature at 32° C. After sufficient dispersion mixing the reaction solution via the high-shear emulsifying machine, the droplet diameters of the dispersed phase in the emulsion were measured, and they had a distribution mainly in a range of 200-500 μm. The emulsion was introduced into a continuous stirred tank reactor, sampling analysis at the following time points of the residence time: 1 hr, 2 hr, 3 hr, and 4 hr, respectively. The results are shown in Table 2.

TABLE 2

The analysis results of Example 2

| Reaction time/hr | Residual BPA/mg/ml | Residual Catalyst/mg/l | Molecular Weight/g/mol | Molecular Weight Distribution |
|---|---|---|---|---|
| 1 | 18.7 | 0 | 15737 | 2.6 |
| 2 | 12.2 | 0 | 16994 | 2.4 |
| 3 | 8.5 | 0 | 17836 | 2.3 |
| 4 | 6.7 | 0 | 18537 | 2.2 |

EXAMPLE 3

Bisphenol A, sodium hydroxide and water were mixed and dissolved to form a phenoxide aqueous solution, i.e., the aqueous phase, wherein Bisphenol A accounted for 15% of the total weight of the aqueous phase, the molar ratio of the hydroxyl group of Bisphenol A to the sodium hydroxide was 1:1.05; and phosgene was dissolved in methylene chloride to form an organic phase, wherein the phosgene concentration was 7.7 wt %. The aqueous phase and the organic phase were pumped into a phosgenation reactor consisting of static mixer at the flow rates of 300 g/min and 280 g/min respectively, maintaining the reaction temperature at 25° C., and obtaining a polycarbonate oligomer solution. Then the oligomer solution was divided into two streams entering into a hole jet reactor (see EP2088139 for the structure of the reactor), and the feeding rate for entering into the impinging region was 1.7 m/s. At the same time, a capping agent (i.e., a p-tert-butylphenol/methylene chloride solution having a concentration of 1.5 wt %) was introduced at a flow rate of 65 g/min and a certain amount of sodium hydroxide aqueous solution at a concentration of 32 wt % was added into the hole-jetting reactor, maintaining the pH value at 12~14 and the reaction temperature at 32° C. After sufficient dispersion mixing the reaction solution, the droplet diameters of the dispersed phase in the emulsion were measured, and they had a distribution mainly in a range of 50-200 μm. The emulsion was introduced into a continuous stirred tank reactor, sampling analysis at the following time points of the residence time: 1 hr, 2 hr, 3 hr, and 4 hr, respectively. The results are shown in Table 3.

TABLE 3

The analysis results of Example 3

| Reaction time/hr | Residual BPA/mg/ml | Residual Catalyst/mg/l | Molecular Weight/g/mol | Molecular Weight Distribution |
|---|---|---|---|---|
| 1 | 13.6 | 0 | 17128 | 2.6 |
| 2 | 6.4 | 0 | 18682 | 2.3 |
| 3 | 2.5 | 0 | 19476 | 2.1 |
| 4 | 1.9 | 0 | 20098 | 2.1 |

EXAMPLE 4

Bisphenol A, sodium hydroxide and water were mixed and dissolved to form a phenoxide aqueous solution, i.e., the aqueous phase, wherein Bisphenol A accounted for 15% of the total weight of the aqueous phase, the molar ratio of the hydroxyl group of Bisphenol A to the sodium hydroxide was 1:1.05; and phosgene was dissolved in methylene chloride to form an organic phase, wherein the phosgene concentration was 7.7 wt %. The aqueous phase and the organic phase were pumped into a phosgenation reactor consisting of static mixers at the flow rates of 300 g/min and 280 g/min respectively, maintaining the reaction temperature at 25° C., and obtaining a polycarbonate oligomer solution. Then the oligomer solution and the capping agent (i.e., a p-tert-butylphenol/methylene chloride solution having a flow rate of 65 g/min and a concentration of 1.5 wt %) were introduced into a high-shear emulsifying machine, the rotational speed of the emulsifying machine being 15000 rpm. At the same time, a certain amount of sodium hydroxide aqueous solution at a concentration of 32 wt % was added into the high-shear emulsifying machine, maintaining the pH value at 12~14 and the reaction temperature at 32° C. After sufficient dispersion mixing the reaction solution via the high-shear emulsifying machine, the droplet diameters of the dispersed phase in the emulsion were measured, and they had a distribution mainly in a range of 1-50 μm. The emulsion was transferred into a static tank for a settlement in the tank, sampling analysis at the following time points of the residence time: 1 hr, 2 hr, 3 hr, and 4 hr, respectively. The results are shown in Table 4.

TABLE 4

The analysis results of Example 4

| Reaction time/hr | Residual BPA/mg/ml | Residual Catalyst/mg/l | Molecular Weight/g/mol | Molecular Weight Distribution |
|---|---|---|---|---|
| 1 | 11.2 | 0 | 17328 | 2.5 |
| 2 | 7.3 | 0 | 18382 | 2.3 |
| 3 | 3.5 | 0 | 19176 | 2.1 |
| 4 | 2.1 | 0 | 19698 | 2.1 |

EXAMPLE 5

Bisphenol A, sodium hydroxide and water were mixed and dissolved to form a phenoxide aqueous solution, i.e., the aqueous phase, wherein Bisphenol A accounted for 15% of the total weight of the aqueous phase, the molar ratio of the hydroxyl group of Bisphenol A to the sodium hydroxide was 1:1.05; and phosgene was dissolved in methylene chloride to form an organic phase, wherein the phosgene concentration was 7.7 wt %. The aqueous phase and the organic phase were pumped into a phosgenation reactor consisting of static mixers at the flow rates of 300 g/min and 280 g/min respectively, maintaining the reaction temperature at 25° C., and obtaining a polycarbonate oligomer solution. Then the oligomer solution and the capping agent (i.e., a p-tert-butylphenol/methylene chloride solution having a flow rate of 65 g/min and a concentration of 1.5 wt %) were introduced into a super-gravity rotating packed bed reactor, the rotational speed of the reactor being 15000 rpm. At the same time, a certain amount of sodium hydroxide aqueous solution at a concentration of 32 wt % was added into the super-gravity reactor, maintaining the pH value at 12~14 and the reaction temperature at 32° C. After sufficient dispersion mixing the reaction solution via the high-shear emulsifying machine, the droplet diameters of the dispersed phase in the emulsion were measured, and they had a distribution mainly in a range of 20-100 μm. The emulsion was introduced into a continuous stirred tank reactor, sampling analysis at the following time points of the residence time: 1 hr, 2 hr, 3 hr, and 4 hr, respectively. The results are shown in Table 5.

TABLE 5

The analysis results of Example 5

| Reaction time/hr | Residual BPA/mg/ml | Residual Catalyst/mg/l | Molecular Weight/g/mol | Molecular Weight Distribution |
|---|---|---|---|---|
| 1 | 12.4 | 0 | 16623 | 2.4 |
| 2 | 4.6 | 0 | 18983 | 2.2 |
| 3 | 2.3 | 0 | 19874 | 2.1 |
| 4 | 1.9 | 0 | 19963 | 2.1 |

COMPARATIVE EXAMPLE 1

Bisphenol A, sodium hydroxide and water were mixed and dissolved to form a phenoxide aqueous solution, i.e., the aqueous phase, wherein Bisphenol A accounted for 15% of the total weight of the aqueous phase, the molar ratio of the hydroxyl group of Bisphenol A to the sodium hydroxide was 1:1.05; and phosgene was dissolved in methylene chloride to form an organic phase, wherein the phosgene concentration was 7.7 wt %. The aqueous phase and the organic phase were pumped into a phosgenation reactor consisting of static mixers at the flow rates of 300 g/min and 280 g/min respectively, maintaining the reaction temperature at 25° C., and obtaining a polycarbonate oligomer solution. Then the oligomer solution and the capping agent (i.e., a p-tert-butylphenol/methylene chloride solution having a flow rate of 65 g/min and a concentration of 1.5 wt %) were introduced into a continuous stirred tank reactor, meanwhile. At the same time, a certain amount of sodium hydroxide aqueous solution at a concentration of 32 wt % was added into the stirred tank reactor, maintaining the pH value at 12~14 and the reaction temperature at 32° C. Sampling analysis at the following time points of the residence time: 1 hr, 2 hr, 3 hr, and 4 hr, respectively. The results are shown in Table 6.

TABLE 6

The analysis results of Comparative Example 1

| Reaction time/hr | Residual BPA/mg/ml | Residual Catalyst/mg/l | Molecular Weight/g/mol | Molecular Weight Distribution |
|---|---|---|---|---|
| 1 | 20.4 | 0 | 14963 | 2.4 |
| 2 | 19.7 | 0 | 15076 | 2.4 |
| 3 | 19.2 | 0 | 15104 | 2.4 |
| 4 | 19.1 | 0 | 15185 | 2.4 |

COMPARATIVE EXAMPLE 2

Bisphenol A, sodium hydroxide and water were mixed and dissolved to form a phenoxide aqueous solution, i.e., the aqueous phase, wherein Bisphenol A accounted for 15% of the total weight of the aqueous phase, the molar ratio of the hydroxyl group of Bisphenol A to the sodium hydroxide was 1:1.05; and phosgene was dissolved in methylene chloride to form an organic phase, wherein the phosgene concentration was 7.7 wt %. The aqueous phase and the organic phase were pumped into a phosgenation reactor consisting of static mixers at the flow rates of 300 g/min and 280 g/min respectively, maintaining the reaction temperature at 25° C., and obtaining a polycarbonate oligomer solution. Then the oligomer solution and the capping agent (i.e., a p-tert-butylphenol/methylene chloride solution having a flow rate of 65 g/min and a concentration of 1.5 wt %) as well as a catalyst (i.e., a triethylamine/methylene chloride solution having a flow rate of 20 g/min and a concentration of 0.2 wt %) were introduced into a continuous stirred tank reactor. At the same time, a certain amount of sodium hydroxide aqueous solution at a concentration of 32 wt % was added into the stirred tank reactor, maintaining the pH value at 12~14 and the reaction temperature at 32° C. Sampling analysis at the following time points of the residence time: 0.25 hr, 0.5 hr, 1 hr, and 2 hr, respectively. The results are shown in Table 7.

TABLE 7

The analysis results of Comparative Example 2

| Reaction time/hr | Residual BPA/mg/ml | Residual Catalyst/mg/l | Molecular Weight/g/mol | Molecular Weight Distribution |
|---|---|---|---|---|
| 0.25 | 6.4 | 0 | 18473 | 2.1 |
| 0.5 | 2.1 | 0 | 20245 | 1.9 |
| 1 | 1.8 | 0 | 20037 | 1.9 |
| 2 | 1.8 | 0 | 19736 | 1.9 |

Although the present invention has illustrated in detail by way of the above specific embodiments, a person skilled in the art will understand that any modification, supplement or replacement can be made to these embodiments without departing from the spirit of the present invention, and the scope of the present invention is determined by the appended claims and is not limited to the above specific embodiments provided herein.

What is claimed is:

1. A method for preparing a polycarbonate, wherein a continuous two-phase interfacial polycondensation process is utilized, the method comprising:
    a) mixing a phenoxide aqueous solution of a bisphenol with a phosgene and an inert organic solvent in a mixing reactor, reacting and generating a polycarbonate oligomer having an average polymerization degree of from 1 to 20;
    b) highly emulsifying the oligomer obtained in step a) by reinforced micromixing to form a stable water-in-oil emulsion, in which the average droplet diameter of the dispersed phase in the emulsion is less than 300 μm, wherein a small quantity of an alkali metal hydroxide aqueous solution is added before the oligomer is emulsified, and the reaction course has a pH value maintained from 8.5 to 14; and
    c) introducing the stable emulsion obtained in step b) into a polycondensation reactor for a chain extending reaction to form a high-molecular-weight polycarbonate solution, finally demulsifying and purifying the reaction solution, thereby obtaining a polycarbonate resin,
    wherein no catalyst is used during the whole continuous two-phase interfacial polycondensation process.

2. The method according to claim 1, wherein in the stable emulsion obtained in step b), the average droplet diameter of the dispersed phase in the emulsion is less than 50 μm.

3. The method according to claim 1, wherein the reinforced micromixing can be achieved using reinforced micromixing equipment selected from the group consisting of a high gravity mixing equipment, a high-speed shearing equipment, a hole jet reactor or an impinging stream reactor.

4. The method according to claim 1, wherein in step b), a capping agent is added before the oligomer is highly emulsified.

5. The method according to claim 1, wherein the polycarbonate oligomer obtained in step a) has an average polymerization degree of from 2 to 15.

6. The method according to claim 5, wherein in step a), the mixing reactor is one or two or more of a series combination selected from the group consisting of a plug flow tubular reactor, an impinging stream reactor, a jet reactor, a stirred tank reactor, and a tubular reactor with a loop.

7. The method according to claim 6, wherein the average residence time of the chain extending reaction in step c) is from 0.5 to 5 hours.

8. The method according to claim 7, wherein the polycondensation reactor in step c) is a tank reactor or tanks-in-series reactor, wherein the tank is a static tank and/or a continuous stirred tank.

9. A method for preparing a polycarbonate, comprising the following steps:
    a) reacting a phenoxide aqueous solution of a bisphenol with a phosgene in the presence of an inert organic solvent to obtain a polycarbonate oligomer having an average polymerization degree of between 1 and 20;
    b) highly emulsifying the liquid containing the oligomer obtained from step a) to obtain a stable water-in-oil emulsion having an average droplet diameter of less than 300 μm, wherein a small quantity of an alkali metal hydroxide aqueous solution is added before the oligomer is emulsified, and the reaction course has a pH value maintained from 8.5 to 14;

c) introducing the emulsion obtained in step b) into a polycondensation reactor to carry out a chain extending reaction, finally demulsifying and purifying the reaction solution, thereby obtaining the polycarbonate resin;

wherein no catalyst is used during the whole continuous two-phase interfacial polycondensation process.

10. The method according to claim 9, wherein in step b), the average droplet diameter of the dispersed phase in the emulsion is less than 50 μm.

11. The method according to claim 9, wherein in step a), the polymerization degree of the polycarbonate oligomer is between 2 and 15.

12. The method according to claim 9, wherein in step c), the average residence time of the chain extending reaction is between 0.5 and 5 hours.

13. The method according to claim 1, wherein in step a), the capping agent is formulated in the phenoxide aqueous solution of a bisphenol.

14. The method according to claim 1, wherein in step a), the capping agent is added at any stage of the reaction course in step a).

* * * * *